United States Patent
Hattiangadi et al.

(10) Patent No.: US 10,934,899 B2
(45) Date of Patent: Mar. 2, 2021

(54) VALVE SEAT INSERT FOR ENGINE HAVING DOUBLE-CROWNED SEATING SURFACE PROFILED FOR LIMITING VALVE RECESSION

(71) Applicant: Caterpillar Inc., Deerfield, IL (US)

(72) Inventors: Ashwin Hattiangadi, Edwards, IL (US); Rong Qu, Dunlap, IL (US); Sanjay Kumar, Dunlap, IL (US); Kevin Yoder, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 63 days.

(21) Appl. No.: 16/188,577

(22) Filed: Nov. 13, 2018

(65) Prior Publication Data

US 2020/0149441 A1    May 14, 2020

(51) Int. Cl.
| | |
|---|---|
| *F01L 3/04* | (2006.01) |
| *F01L 3/22* | (2006.01) |
| *F02M 21/02* | (2006.01) |
| *F16K 1/42* | (2006.01) |
| *F16K 25/00* | (2006.01) |
| *F16K 25/04* | (2006.01) |

(52) U.S. Cl.
CPC ............... *F01L 3/04* (2013.01); *F01L 3/22* (2013.01); *F02M 21/023* (2013.01); *F02M 21/026* (2013.01); *F16K 1/42* (2013.01); *F16K 25/005* (2013.01); *F16K 25/04* (2013.01)

(58) Field of Classification Search
CPC ....... F01L 3/04; F01L 3/22; F01L 3/20; F01L 3/00; F02M 21/023; F02M 21/026; F16K 1/42; F16K 25/005; F16K 25/04
See application file for complete search history.

(56) References Cited

U.S. PATENT DOCUMENTS

| | | | |
|---|---|---|---|
| 4,999,911 A | 3/1991 | Anderson | |
| 5,970,614 A | 10/1999 | Adachi et al. | |
| 9,228,458 B2 * | 1/2016 | Reinhart | .......... F01L 3/04 |
| 2012/0085309 A1 * | 4/2012 | Cleeves | .......... F01L 5/18 |
| | | | 123/188.5 |

FOREIGN PATENT DOCUMENTS

| | | |
|---|---|---|
| CN | 203783672 U | 8/2014 |
| CN | 105422206 A | 3/2016 |
| JP | 8270417 A | 10/1996 |
| JP | 3715437 B2 | 11/2005 |
| JP | 2009057830 A | 3/2009 |
| WO | 0206640 | 1/2002 |
| WO | 2017090330 | 6/2017 |

* cited by examiner

*Primary Examiner* — Jacob M Amick
*Assistant Examiner* — Charles Brauch
(74) *Attorney, Agent, or Firm* — Brannon Sowers & Cracraft

(57) ABSTRACT

A valve seat insert for a gas exchange valve controlling gas exchange of a cylinder includes an insert body having an inner peripheral surface, an outer peripheral surface, and a valve seating surface structured to contact the gas exchange valve at a closed position and profiled to limit valve recession thereof. The valve seating surface includes an arrangement of linear segments and curved segments forming crowns to contact the gas exchange valve at different wear states.

19 Claims, 4 Drawing Sheets

VALVE SEAT INSERT FOR ENGINE HAVING DOUBLE-CROWNED SEATING SURFACE PROFILED FOR LIMITING VALVE RECESSION

TECHNICAL FIELD

The present disclosure relates generally to engine valves and associated hardware, and more particularly to an engine valve seat insert for an exhaust valve or an intake valve that is profiled so as to limit valve recession.

BACKGROUND

Gas exchange valves are used in internal combustion engines to control fluid connections between the cylinder and a supply of intake air or intake air and other gases such as recirculated exhaust gas, or between the cylinder and an exhaust manifold for expelling combustion products during operation. Designs are known wherein a single intake valve and a single exhaust valve are associated with each cylinder in an engine, as well as designs where multiple gas exchange valves of each respective type are associated with each cylinder. A camshaft, typically rotated at half engine speed, is coupled with valve lifters, bridges, rocker arms, and/or other equipment for controlling the opening and closing of gas exchange valves at appropriate engine timings.

Gas exchange valves are moved out of contact with and into contact with the engine head or a valve seat insert within the engine head to effect their opening and closing actions. Gas exchange valves may be moved between their open and closed positions with significant mechanical forces. The in-cylinder environment is associated with combustion temperatures of several hundred degrees along with relatively high pressures. These and other factors contribute to gas exchange valve operating conditions being quite harsh. It has been observed that gas exchange valves and valve seats or valve seat inserts can exhibit a phenomenon over time known as valve recession. Over the course of an engine's service life, or between service intervals, the contacts between a gas exchange valve and its valve seat can number in the millions or potentially even billions. The harsh conditions and great number of impacts can cause material of which the gas exchange valve and/or the valve seat is formed to wear away and/or become deformed, so that the valve "recedes" toward or into the engine head further than what is desired. Where valve seat recession becomes severe enough engine operation or performance can be compromised, sometimes requiring a so-called top end overhaul prematurely. Engineers have experimented with a variety of different techniques attempting to ameliorate the extent and effects of valve seat recession and other valve wear patterns. One strategy apparently aimed at preventing the outer diameter side of a valve face from locally wearing is set forth in Japanese Patent Application Publication No. JP8270417A. According to the '417 reference, a convex surface bulging toward a seat surface of a valve face abuts against the seat surface of a valve seat to address local wear problems.

SUMMARY OF THE INVENTION

In one aspect, an internal combustion engine includes an engine housing having a cylinder block with a cylinder formed therein, and an engine head coupled to the cylinder block and having a gas exchange conduit formed therein. A valve seat insert is positioned at least partially within the engine head and defines a valve seat center axis. The internal combustion engine further includes a gas exchange valve with a valve head having an outer valve face and an inner valve face, and the gas exchange valve being movable between a closed valve position where the inner valve face contacts the valve seat insert, and an open valve position. The valve seat insert includes a first axial end surface facing the cylinder, a second axial end surface, an inner peripheral surface defining an opening fluidly between the cylinder and the gas exchange conduit, an outer peripheral surface, and a valve seating surface extending between the first axial end surface and the inner peripheral surface. The valve seating surface is profiled to limit valve recession and includes, in profile, an outer linear segment adjacent to the first axial end surface, an outer curved segment adjacent to the outer linear segment and forming a first crown contacted by the gas exchange valve at an early wear state, an inner linear segment adjacent to the outer curved segment, and an inner curved segment adjacent to the inner linear segment and forming a second crown contacted by the gas exchange valve at a later wear state.

In another aspect, a valve seat insert for a gas exchange valve controlling gas exchange of a cylinder in an internal combustion engine includes an annular insert body defining a valve seat center axis extending between a first axial end surface structured for facing the cylinder in the internal combustion engine, and a second axial end surface. The annular insert body has an inner peripheral surface defining an opening structured to fluidly connect the cylinder to a gas exchange conduit in an engine head and having a taper opening in a direction of the second axial end, an outer peripheral surface having a cylindrical shape and located at a uniform distance from the valve seat center axis, and a valve seating surface extending between the first axial end surface and the inner peripheral surface. The valve seating surface of each of the plurality of valve seat inserts is structured to contact the gas exchange valve at a closed position and profiled to limit valve recession of the gas exchange valve. The valve seating surface includes, in profile, an outer linear segment adjacent to the first axial end surface, an outer curved segment adjacent to the outer linear segment and forming a first crown for contacting the gas exchange valve at an early wear state, an inner linear segment adjacent to the outer curved segment, and an inner curved segment adjacent to the inner linear segment and forming a second crown for contacting the gas exchange valve at a later wear state.

In still another aspect, an engine head assembly for an internal combustion engine includes an engine head having a plurality of gas exchange conduits formed therein, and a plurality of valve seat inserts for a plurality of gas exchange valves of the internal combustion engine. Each of the valve seat inserts is positioned at least partially within the engine head and defines a valve seat center axis extending between a first axial end surface and a second axial end surface. Each of the plurality of valve seat inserts further has an inner peripheral surface defining an opening structured to fluidly connect the cylinder with the corresponding gas exchange conduit, an outer peripheral surface, and a valve seating surface extending between the corresponding first axial end surface and inner peripheral surface. The valve seating surface is structured to contact the corresponding gas exchange valve at a closed position and includes, in profile, an outer linear segment adjacent to the first axial end surface, an outer curved segment adjacent to the outer linear segment and forming a first crown for contacting the corresponding gas exchange valve at an early wear state, an inner linear segment adjacent to the outer curved segment, and an inner curved segment adjacent to the inner linear segment and forming a second crown for contacting the corresponding gas exchange valve at a later wear state.

DETAILED DESCRIPTION

Figure 1:
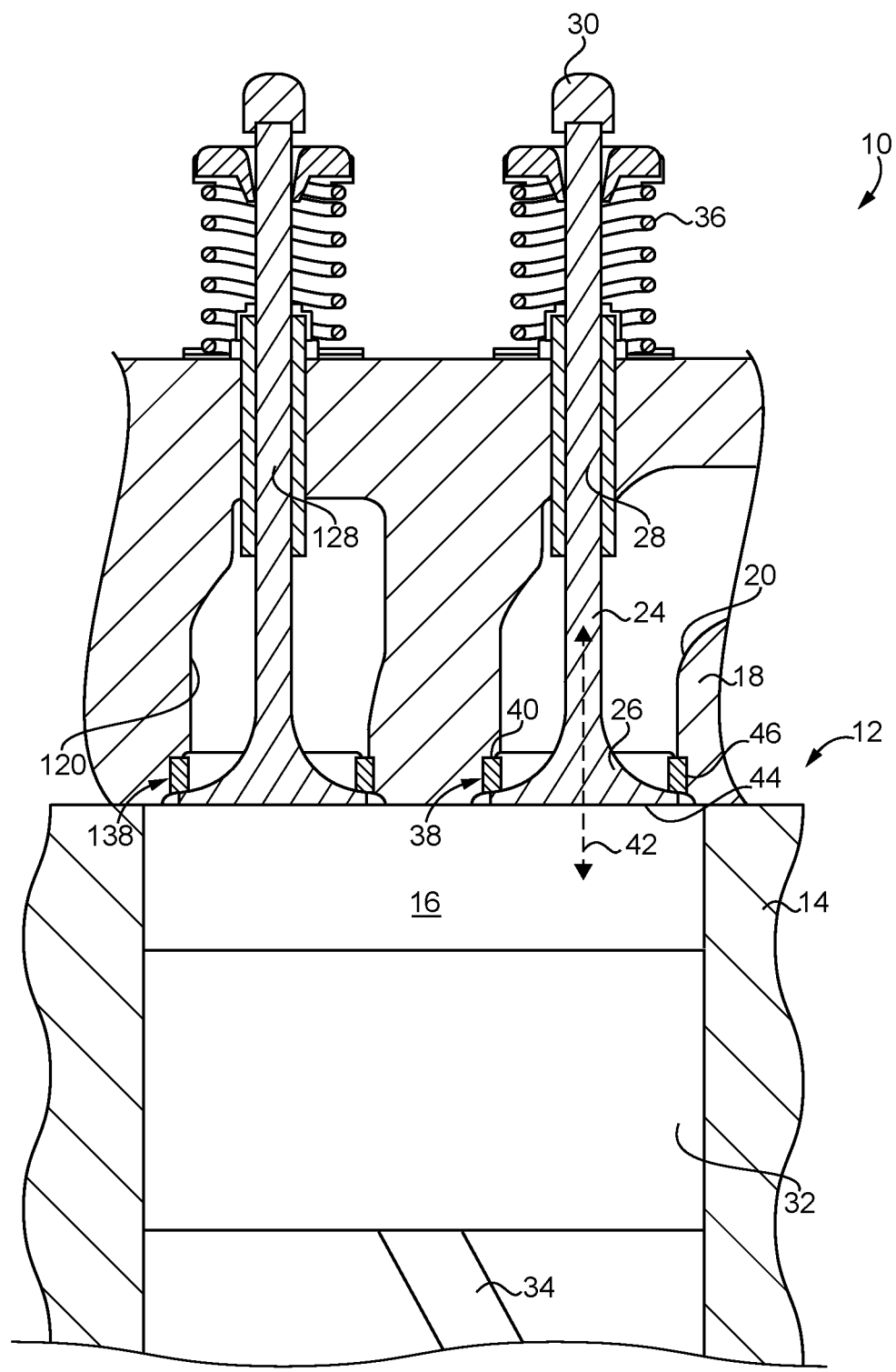
FIG. 1 is a sectioned side diagrammatic view of an internal combustion engine, according to one embodiment.

Referring to FIG. 1, there is shown an internal combustion engine according to one embodiment and including an engine housing 12 having a cylinder block 14 with a cylinder 16 formed therein. Internal combustion engine 10 (hereinafter "engine 10") could be any of a variety of engines including a compression ignition diesel engine, a spark-ignited gasoline engine, a gaseous fuel engine structured to operate on a fuel that is gaseous at standard temperature and pressure, a dual fuel engine, or still another. In a compression ignition diesel engine application, such as a direct-injected diesel engine, suitable fuels could include diesel distillate fuel, biodiesel, blends of these, or still others. An engine head 18 is coupled to cylinder block 14 and has a first gas exchange conduit 20 and a second gas exchange conduit 120 formed therein. Gas exchange conduits 20 and 120 could each or either be an intake conduit structured to fluidly connect with an intake manifold or an exhaust conduit structured to connect with an exhaust manifold. In a practical implementation strategy, gas exchange conduit 20 is an intake conduit and gas exchange conduit 120 is an exhaust conduit.

A piston 32 is movable within cylinder 16 between a bottom dead center position and a top dead center position and is coupled to a crankshaft (not shown) by way of a connecting rod 34 in a generally conventional manner. Engine 10 could include any number of cylinders arranged in any suitable configuration such as a V-configuration, an in-line configuration, or still another. Engine head 18 could include a monolithic engine head associated with all of a plurality of cylinders in engine 10, or could be one of a plurality of separate engine head sections each associated with less than all of the cylinders in engine 10. Engine 10 further includes a first gas exchange valve 24 and a second gas exchange valve 124. Gas exchange valve 24, including aspects of its structure and operation, is discussed herein in the singular, however, it will be understood that the description of gas exchange valve 24 can apply by way of analogy to any other gas exchange valves within engine 10, except where otherwise indicated. As will be further apparent from the following description, there are certain differences between gas exchange valve 24 and gas exchange valve 124 tailored to the different functions of controlling intake gas exchange and exhaust gas exchange. Gas exchange valve 24 is shown more or less vertically oriented with respect to a direction of reciprocation of piston 32, however, it should also be appreciated that other configurations such as gas exchange valves at diagonal orientations are contemplated herein. Gas exchange valve 24 also includes a shaft 28 connected to a valve head 26. A valve bridge 30 or the like may be coupled to gas exchange valve 24 such that gas exchange valve 24 can move together with another gas exchange valve (not shown) between open and closed positions, such as in response to rotation of a camshaft and movement of a rocker arm, a valve lifter assembly, and/or other equipment. A return spring 36 is coupled with gas exchange valve 24 in a generally conventional manner.

Engine 10 further includes an engine head assembly formed by engine head 18 and a plurality of valve seat inserts 38 and 138 associated with gas exchange valves 24 and 124, respectively. Gas exchange valve 24, and by analogy gas exchange valve 124, is movable between a closed valve position and an open valve position. At the closed valve position an inner valve face 46 contacts valve seat insert 38, whereas gas exchange valve 124 contacts valve seat insert 138. At the closed position cylinder 16 is blocked from fluid communication with the corresponding gas exchange conduit 20 and 120. At the open valve position fluid communication exists. An outer valve face 44 or combustion face is oriented toward cylinder 16. As will also be further apparent from the following description, valve seat insert 38 and valve seat insert 138 are structured, together with the corresponding gas exchange valves 24 and 124, to slow and alter the nature of valve recession over the course of a service life or service interval of engine 10.

Figure 2:
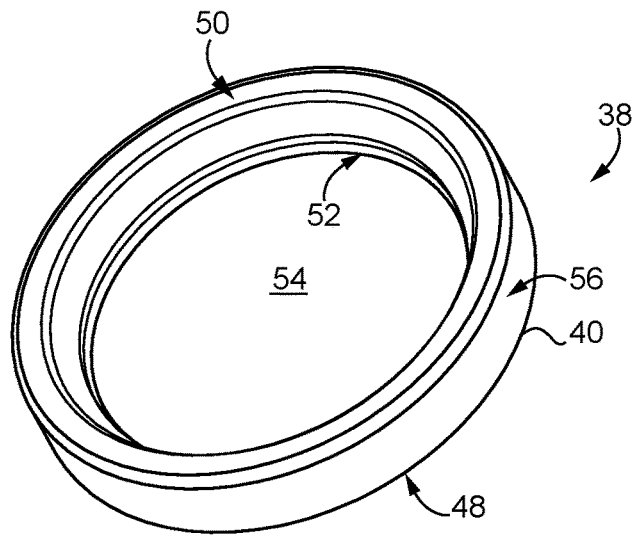
FIG. 2 is a pictorial view of a valve seat insert, according to one embodiment.
Figure 3:
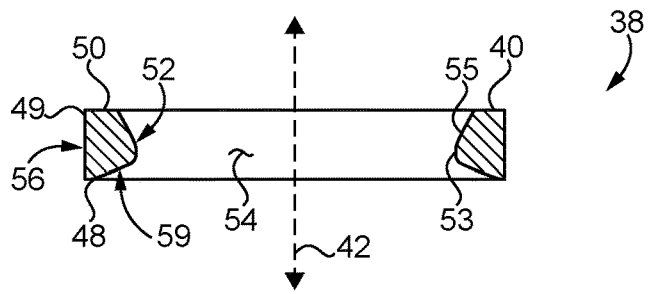
FIG. 3 is a sectioned view through the valve seat insert of FIG. 2.

Referring also now to FIGS. 2 and 3, there is shown valve seat insert 38 in greater detail. It will also be appreciated that descriptions of certain of the features of valve seat insert 38 will be understood to refer to analogous features of valve seat insert 138 except where otherwise indicated. Valve seat insert 38 includes an annular one-piece insert body 40 that is positioned at least partially within engine head 18 and defines a valve seat center axis 42. Insert body 40 may be cast and machined, and formed of a steel such as a high-alloy hardened steel or tool steel. Valve seat insert 38 further includes a first axial end surface 48 facing cylinder 16, a second axial end surface 50, an inner peripheral surface 52 defining an opening 54 to be positioned fluidly between cylinder 16 and gas exchange conduit 20 to fluidly connect the same, an outer peripheral surface 56, and a valve seating surface 59 extending between first axial end surface 48 and inner peripheral surface 52. Valve seat center axis 42 extends between first axial end surface 48 and second axial end surface 50. Inner peripheral surface 52 can further be seen to have a taper opening in a direction of second axial end surface 50. Outer peripheral surface 56 has a cylindrical shape and may be located at a uniform distance from valve seat center axis 42. In an implementation, valve seat insert 38 is "dry," meaning that no additional cooling by way of engine coolant or the like is employed. Outer peripheral surface 56 may be uninterrupted in abutment against engine head 18, such that when valve seat insert 38 is positioned within engine head 18 for service such as by way of an interference fit, there is no backside cooling void, or other cavity formed that provides liquid cooling to valve seat insert 38. A chamfer 49 extends between outer peripheral surface 56 and second axial end surface 50. It can also be noted that inner peripheral surface 52 has a cylindrical section 53 that is concentric with outer peripheral surface 56, and a conical section 55 that forms the taper.

Figure 4:
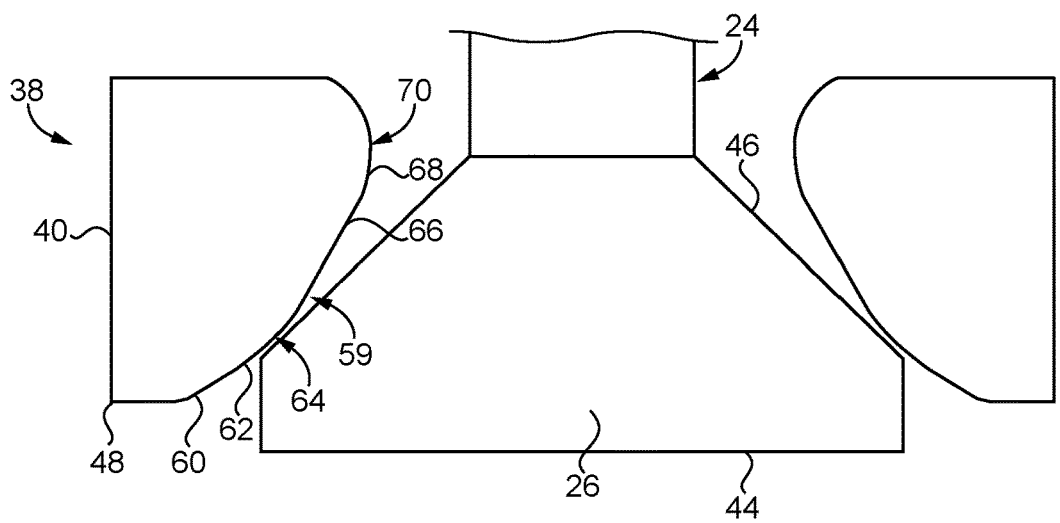
FIG. 4 is a concept diagram illustrating structural attributes of a valve seat insert and gas exchange valve, according to one embodiment.

Referring also now to FIG. 4, there is shown a concept diagram illustrating further features of valve seat insert 38. In the illustration of FIG. 4 certain of these features are exaggerated, as in an actual engineering drawing to scale the features could be challenging to see. It will be appreciated in view of further discussion herein that certain of the features of valve seat insert 38 and valve seat insert 138 represent variations of certain core principles discovered to be applicable to both intake and exhaust valves in at least certain applications. Thus, the concept illustration of FIG. 4 could be understood to illustrate features of either of valve seat inserts 38 or 138, and any of the other embodiments contemplated herein. It will be recalled that valve seat insert 38 is structured to slow and influence the progression of certain wear modes resulting from contact between a valve and valve seat over tune. Valve seat insert 38 includes valve seating surface 59 extending between first axial end surface 48 and inner peripheral surface 52 as discussed above. Valve seating surface 59 may be profiled to limit valve recession and includes, in profile, an outer linear segment 60 adjacent to first axial end surface 48, an outer curved segment 62 adjacent to outer linear segment 60, an inner linear segment 66 adjacent to outer curved segment 62, and an inner curved segment 68 adjacent to inner linear segment 66. Outer curved segment 62 forms a first crown 64 contacted by gas exchange valve 24 at an early wear state, and inner curved segment 68 forms a second crown 70 contacted by gas exchange valve 24 at a later wear state. Initial contact when valve seat insert 38 and gas exchange valve 24 are first placed in service may occur at a contact band between inner valve face 46 and first crown 64. As the respective components deform and wear they may transition from an early wear state where the components have a line contact or nearly line contact, band Minted between inner valve face 46 and first crown 64, to full face contact where inner valve face 46 is parallel to and fully in contact with part of outer curved segment 62 and inner linear segment 66, and a still later wear state where full face contact is maintained but transitions also to contact with second crown 70. It should be appreciated that the term "early wear state" and the term "later wear state" are used herein in relation to one another, not necessarily meaning that "early" contemplates new nor that "later" contemplates old, although such terms could apply in an actual case. As suggested above, the basic principles illustrated in FIG. 4 relative to profiling of valve seating surface 59 have application to a number of different embodiments, some having additional structural details.

Figure 5:
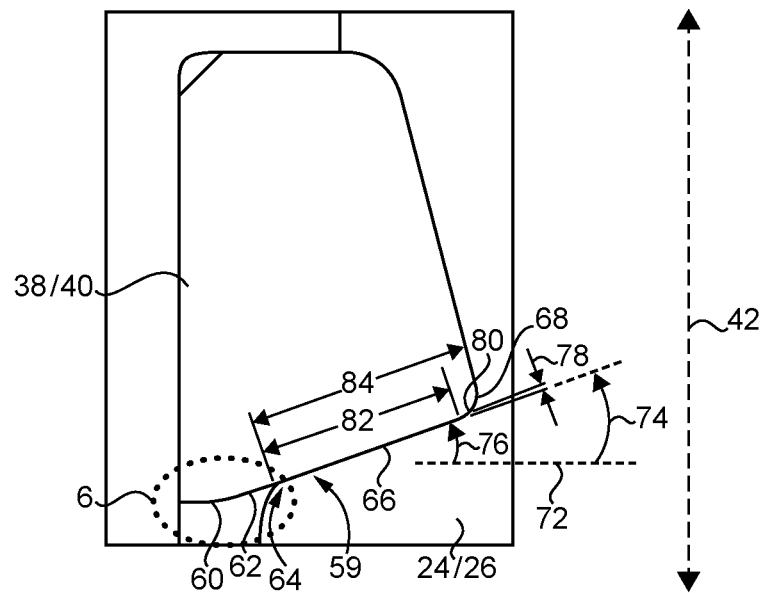
FIG. 5 is a sectioned side diagrammatic view of portions of a gas exchange valve and valve seat insert, according to one embodiment.

Referring also now to FIG. 5, there is shown a view of parts of valve seat insert 38, which can include an intake valve seat insert, and insert body 40 shown in contact with part of gas exchange valve 24/valve head 26. In the illustration of FIG. 5 it can be seen that inner valve face 46 is oriented at a valve angle 74 relative to a plane 72 that is oriented normal to valve seat center axis 42. Inner linear segment 66 is oriented at a seat angle 76 relative to plane 72 that is larger than valve angle 74. An interference angle 78 is formed by inner valve face 46 and inner linear segment 66, and a clearance 80 is formed between inner valve face 46 and inner linear segment 66. Valve angle 74 may differ from seat angle 76 by about 0.4° to about 0.6°. Seat angle 76 may be from about 20° to about 30°, and seat angle 76 may be about 20° in one practical implementation. Interference angle 78 may be about 0.37°. As used herein, the term "about" should be understood in the context of conventional rounding to a consistent number of significant digits. Accordingly, "about 20" means from 19.5 to 20.4, "about 19.5" means from 19.45 to 19.54, and so on.

Figure 6:
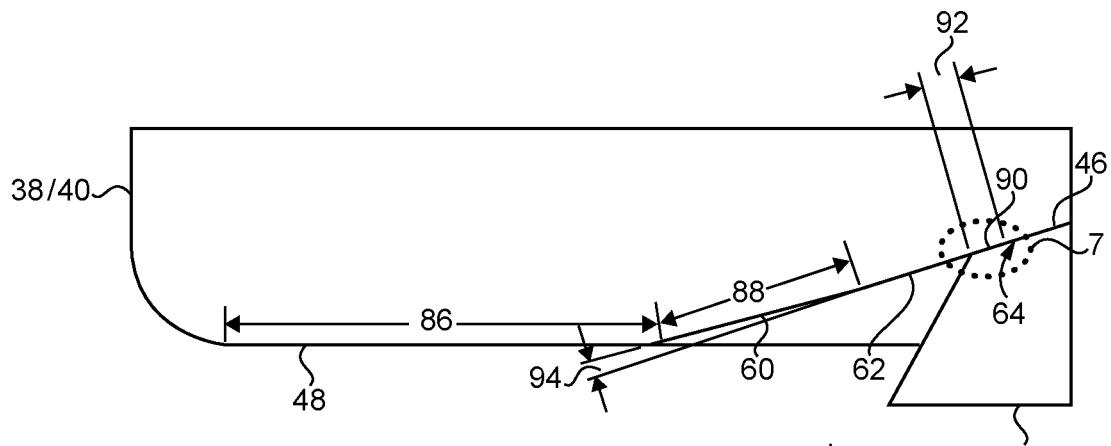
FIG. 6 is a detail view taken from circle 6 of FIG. 5.
Figure 7:
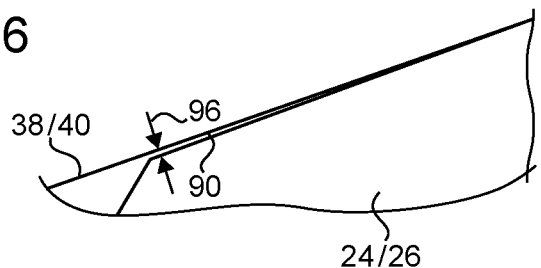
FIG. 7 is a detail view taken from circle 7 of FIG. 6.

Referring also now to FIG. 6 and FIG. 7, a second clearance 90 may be formed between inner valve face 46 and outer curved segment 62 and extends radially outward and axially outward from a contact band formed at the early wear state approximately as depicted, between inner valve face 46 and first crown 64. It will be recalled that the initial contact band may have an annular form and may be substantially a line contact pattern but expected to commence changing toward a face contact pattern as early break-in occurs. A size of the second clearance 90 may include a facing length 92 that is about 0.1 millimeters, between inner valve face 46 and outer curved segment 62 of valve seating surface 59. Facing length 92 can be understood as the distance from the contact band to an outer edge of valve head 26. The term "axially inward" as used herein should be understood to mean a direction that is along valve seat center axis 42 toward a midpoint of a line segment of axis 42 that corresponds to a full axial length dimension of valve seat insert 38. "Axially outward" means an opposite direction, away from that midpoint. "Radially inward" and "radially outward" are terms used generally conventionally. Another angle 94 may be formed between outer linear segment 60 and inner linear segment 66 and may be about 5°. An edge clearance distance is shown at 96 and indicates a gap distance to outer curved segment 62 at an outer edge of inner valve face 46, and may be about 0.00056 millimeters. Also shown in FIG. 5 is a full seating width dimension 84 or theoretical seating width of valve seat insert 38 that may eventually become available as wear between the components progresses, in comparison to a face contact width obtained when fill face contact initially occurs. Face contact width is shown at 82 and could be observed after early break-in. In an implementation, full seating width dimension 84 might be about 4.7 millimeters. Face contact width 82 in the embodiment of FIG. 5 may be about 4.3 millimeters. An end face width of first axial end surface 48 is shown at 86 in FIG. 6 and may be about 1 millimeter. A linear segment width of outer linear segment 60 is shown at 88 and may be about 0.5 millimeters.

Figure 8:
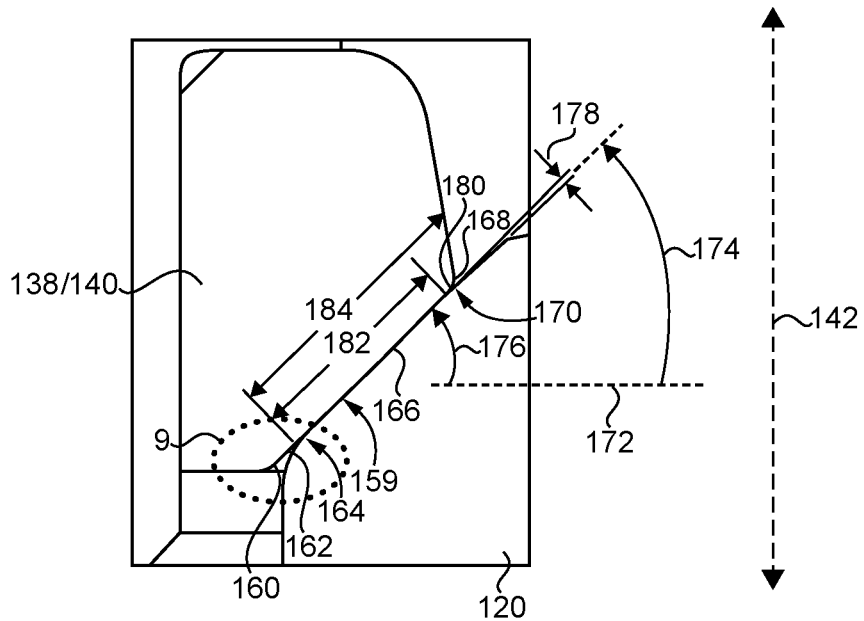
FIG. 8 is a sectioned side diagrammatic view of portions of a gas exchange valve and a valve seat insert, according to another embodiment.
Figure 9:
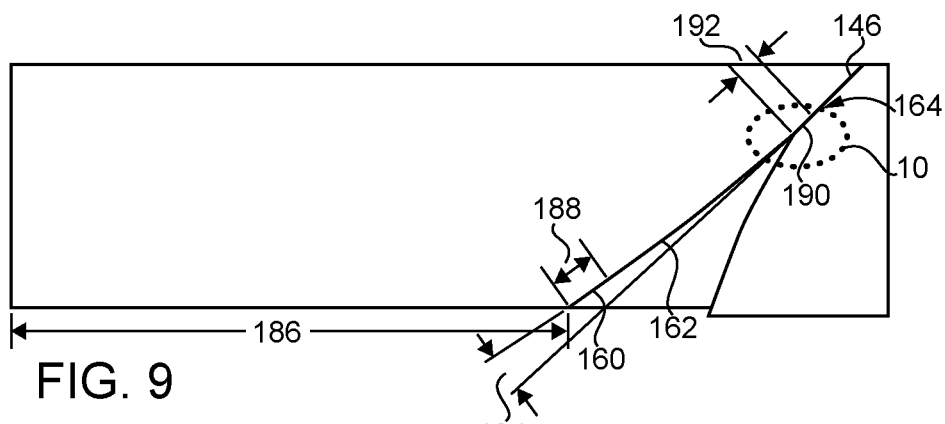
FIG. 9 is a detail view taken at circle 9 of FIG. 8.
Figure 10:
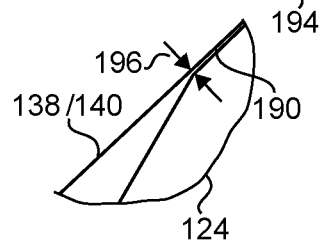
FIG. 10 is a detail view taken at circle 10 of FIG. 9.

Turning now to FIG. 8, there are shown features of valve seat insert 138 and an insert body 140 in contact with gas exchange valve 124, in further detail. Valve seat insert 138 includes a valve seating surface 159 profiled to limit valve recession and includes, in profile, an outer linear segment 160 adjacent to a first axial end surface (not numbered), an outer curved segment 162 adjacent to outer linear segment 160 and forming a first crown 164 contacted by gas exchange valve 124 at an early wear state. Valve seating surface 159 further includes an inner linear segment 166 adjacent to outer curved segment 162, and an inner curved segment 168 adjacent to inner linear segment 166 and forming a second crown 170 contacted by gas exchange valve 124 at a later wear state. An inner valve face 146 is oriented at a valve angle 174 relative to a plane 172 normal to a valve seat center axis 142. Inner linear segment 166 is oriented at a seat angle 176 relative to plane 172 that is larger than valve angle 174 such that an interference angle 178 is formed. A clearance 180 is formed between gas exchange valve 124 and inner linear segment 166. Valve angle 174 may be about 44.4°. Seat angle 176 may be about 45°. Interference angle 178 may be about 0.6°. A second clearance 190, as shown in FIG. 9 and FIG. 10, extends radially outward and axially outward from a contact band between inner valve face 146 and first crown 164. In valve seat insert 138, which can include an exhaust valve seat insert, a full seating width dimension 184 may be about 5.2 millimeters. A face contact width 182 may be about 4.8 millimeters. A linear segment width 188 may be about 0.3 millimeters, and an end face width 186 may be about 1.88 millimeters. A clearance facing length 192 may be about 0.1 millimeters, an edge clearance 196 may be about 0.00052 millimeters. An angle 194 between outer linear segment 160 and inner linear segment 166 may be about 10°.

As suggested above, various features and proportions of the different valve seat insert embodiments may be within common dimensional or proportional ranges, with the illustrated embodiments representing different practical implementation strategies. Following are general dimensional and angular ranges discovered to provide suitable core design principles. A size of outer curved segment 62, 162 may be larger than a size of inner curved segment 68, 168. Outer curved segment 62, 162 may be formed by a first radius having a size from about 3 millimeters to about 6 millimeters. Inner curved segment 68, 168 may be formed by a second radius having a size from about 0.4 millimeters to about 3 millimeters. In one implementation, the size of the first radius forming outer curved segment 62, 162 may be about 4.5 millimeters. Outer curved segment 62, 162 and inner linear segment 66, 166 together form a face contact width from about 4 millimeters to about 5 millimeters. As used herein, the term "radius," refers to a physical surface structure, whereas radius "size" means the dimension of a geometric radius of a circle defined by that physical surface structure. With regard to seat angle, a range from about 20° to about 45° may be suitably applied. Interference angle 78, 178 may be from about 0.3° to about 0.6°. Face contact width 82, 182 may be from about 4 millimeters to about 5 millimeters. Facing length 88, 188 may be from about 0.1 millimeters to about 0.3 millimeters. Angle 94, 194 may be from about 5° to about 10°. A running length of outer linear segment 60,160 may be from about 0.5 millimeters to about 1 millimeter. A running length of inner linear segment 66, 166 can vary consistent with the full face width range and other valve seating surface parameters discussed herein.

INDUSTRIAL APPLICABILITY

Operation of engine 10 can be expected over time to result in gas exchange valve and valve seat insert wear such that gas exchange valve 24, 124 and valve seat insert 38, 138 transitions from a new or early wear state, substantially as depicted in the drawings, to a later wear state. Initial contact between gas exchange valve 24, 124 can be line contact or close to line contact upon crown 64, 164 in the early wear state, with the gradual wearing-away of and/or deformation of material over time causing the components to assume full face contact as described herein at a later wear state. Full face contact can continue for the service live of the components, with valve 24, 124 beginning to contact second crown 70, 170 at a still later wear state.

Engineers have attempted for many years to develop strategies for reducing the rate and/or manner of gas exchange valve and valve seat/valve seat insert wear, challenges compounded with continued changes to engine configuration and operating characteristics that can render designs fine-tuned for one application less well-suited to improved versions of even the same engine. Moreover, due at least in part to the differing design and performance requirements among different types of gas exchange valves, such as intake valves versus exhaust valves, the valves themselves and the valve seat inserts are often not interchangeable between or among valve types. As a result, valve seat inserts and associated valve components are often engineered with specificity for only a single application. Referring to the drawings generally, and from the foregoing description, it will be appreciated that valve seating surfaces having analogous features are used for both exhaust and intake valve applications according to the present disclosure. As a result, a great many different applications to different gas exchange valves are expected to be available following the general teachings set forth herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An internal combustion engine comprising:
   an engine housing including a cylinder block having a cylinder formed therein, and an engine head coupled to the cylinder block and having a gas exchange conduit formed therein;
   a valve seat insert positioned at least partially within the engine head and defining a valve seat center axis; and
   a gas exchange valve including a valve head having an outer valve face and an inner valve face, and the gas exchange valve being movable between a closed valve position where the inner valve face contacts the valve seat insert, and an open valve position,
   the valve seat insert having a first axial end surface facing the cylinder, a second axial end surface, an inner peripheral surface defining an opening fluidly between the cylinder and the gas exchange conduit, an outer peripheral surface, and a valve seating surface extending between the first axial end surface and the inner peripheral surface,
   the valve seating surface being profiled to limit valve recession and including, in profile,
   an outer linear segment adjacent to the first axial end surface,
   an outer curved segment adjacent to the outer linear segment and forming a first crown contacted by the gas exchange valve at an early wear state, the outer curved segment being formed by a first radius,
   an inner linear segment adjacent to the outer curved segment, and
   an inner curved segment adjacent to the inner linear segment and forming a second crown contacted by the gas exchange valve at a later wear state, the inner curved segment being formed by a second radius,
   the first radius being greater than the second radius.

2. The internal combustion engine of claim 1 wherein the inner valve face is oriented at a valve angle relative to a plane normal to the valve seat center axis, and the inner linear segment is oriented at a seat angle relative to the plane that is larger than the valve angle such that an interference angle is formed by the inner valve face and the inner linear segment and a clearance is formed therebetween.

3. The internal combustion engine of claim 2 wherein the interference angle is from about 0.3° to about 0.6°, and wherein a second clearance is formed between the inner valve face and the outer curved segment and extends radially outward and axially outward from a contact band between the inner valve surface and the first crown.

4. The internal combustion engine of claim 3 wherein a size of the second clearance includes a facing length of about 0.1 millimeters between the inner valve face and the outer curved segment of the valve seating surface.

5. The internal combustion engine of claim 2 wherein:
the first radius has a size from about 3 millimeters to about 6 millimeters;
the second radius has a size not less than about 0.4 millimeters and less than the first radius; and
the outer curved segment and the inner linear segment together form a face contact width from about 4 millimeters to about 5 millimeters.

6. The internal combustion engine of claim 5 wherein the size of the first radius is about 4.5 millimeters.

7. The internal combustion engine of claim 5 wherein the gas exchange conduit includes an intake conduit and the gas exchange valve includes an intake valve where the seat angle is from about 20° to about 30°.

8. The internal combustion engine of claim 5 wherein the gas exchange conduit includes an exhaust conduit and the gas exchange valve includes an exhaust valve where the seat angle is about 45°.

9. A valve seat insert for a gas exchange valve controlling gas exchange of a cylinder in an internal combustion engine, the valve seat insert comprising:
an annular insert body defining a valve seat center axis extending between a first axial end surface structured for facing the cylinder in the internal combustion engine, and a second axial end surface;
the annular insert body further having an inner peripheral surface defining an opening structured to fluidly connect the cylinder to a gas exchange conduit in an engine head and having a taper opening in a direction of the second axial end surface, an outer peripheral surface having a cylindrical shape and located at a uniform distance from the valve seat center axis, and a valve seating surface extending between the first axial end surface and the inner peripheral surface;
the valve seating surface being structured to contact the gas exchange valve at a closed position and profiled to limit valve recession of the gas exchange valve, the valve seating surface including, in profile,
an outer linear segment adjacent to the first axial end surface,
an outer curved segment adjacent to the outer linear segment and forming a first crown for contacting the gas exchange valve at an early wear state, the outer curved segment being formed by a first radius,
an inner linear segment adjacent to the outer curved segment, and
an inner curved segment adjacent to the inner linear segment and forming a second crown for contacting the gas exchange valve at a later wear state, the inner curved segment being formed by a second radius,
the first radius being greater than the second radius.

10. The valve seat insert of claim 9 wherein the inner peripheral surface has a cylindrical section that is concentric with the outer peripheral surface, and a conical section forming the taper.

11. The valve seat insert of claim 9 wherein the first radius has a size from about 3 millimeters to about 6 millimeters, and the second radius has a size not less than about 0.4 millimeters and less than the second radius.

12. The valve seat insert of claim 11 wherein the outer curved segment and the inner linear segment together form a face contact width from about 4 millimeters to about 5 millimeters.

13. The valve seat insert of claim 12 wherein the inner linear segment defines a seat angle from about 20° to about 45°.

14. The valve seat insert of claim 13 wherein the first radius has a size of about 4.5 millimeters, the second radius has a size of about 0.5 millimeters, the face contact width is about 4.7 millimeters, and the seat angle is about 45°.

15. The valve seat insert of claim 13 wherein the first radius has a size of about 4.5 millimeters, the second radius has a size of about 0.4 millimeters, the face contact width is about 4.3 millimeters, and the seat angle is about 20°.

16. An engine head assembly for an internal combustion engine, the engine head assembly comprising:
an engine head having a plurality of gas exchange conduits formed therein; and
a plurality of valve seat inserts for a plurality of gas exchange valves of the internal combustion engine, each valve seat insert of the plurality of valve seat inserts being positioned at least partially within the engine head and defining a valve seat center axis extending between a first axial end surface structured to face a cylinder in the internal combustion engine, and a second axial end surface,
each valve seat insert further having an inner peripheral surface defining an opening structured to fluidly connect the cylinder to the corresponding gas exchange conduit, an outer peripheral surface, and a valve seating surface extending between the corresponding first axial end surface and inner peripheral surface;
the valve seating surface of each valve seat insert being structured to contact the corresponding gas exchange valve at a closed position and including, in profile,
an outer linear segment adjacent to the first axial end surface,
an outer curved segment adjacent to the outer linear segment and forming a first crown for contacting the corresponding gas exchange valve at an early wear state, the outer curved segment being formed by a first radius,
an inner linear segment adjacent to the outer curved segment, and
an inner curved segment adjacent to the inner linear segment and forming a second crown for contacting the corresponding gas exchange valve at a later wear state,
the inner curved segment being formed by a second radius,
the first radius being greater than the second radius.

17. The engine head assembly of claim 16 wherein the inner linear segment of a first valve seat insert of the plurality of valve seat inserts defines a seat angle of about 20°, and
the inner linear segment of a second valve seat insert of the plurality of valve seat inserts defines a seat angle of about 45°.

18. The engine head assembly of claim 17 wherein:

the first radius has a size from about 3 millimeters to about 6 millimeters, and the second radius has a size not less than about 0.4 millimeters and less than the first radius; and the outer curved segment and the inner linear segment in the valve seating surface of each valve seat insert together form a face contact width from about 4 millimeters to about 5 millimeters.

19. The engine head assembly of claim 18 wherein the outer peripheral surface of each valve seat insert is uninterrupted in abutment against the engine head.

\* \* \* \* \*